United States Patent [19]

Due

[11] Patent Number: 4,935,992
[45] Date of Patent: Jun. 26, 1990

[54] LEAK REDUCTION HOSE CLAMP

[75] Inventor: Wesley Due, Flippin, Ark.

[73] Assignee: Micro Plastics, Inc., Flippin, Ark.

[21] Appl. No.: 335,722

[22] Filed: Apr. 10, 1989

[51] Int. Cl.$^5$ ............................................. F16L 33/02
[52] U.S. Cl. ................................ 24/16 R; 24/20 T T
[58] Field of Search .......... 24/20 T T, 16 R, 16 P B, 24/20 R, 30.5 P, 543; 248/74.1, 74.3

[56] References Cited

U.S. PATENT DOCUMENTS

| | | |
|---|---|---|
| 673,382 | 5/1901 | Chaffee . |
| 3,229,998 | 1/1966 | Pennington . |
| 3,605,200 | 9/1971 | Vallinotto . |
| 3,925,851 | 12/1975 | Bevans . |
| 4,061,299 | 12/1977 | Kurosaki ...................... 248/74.3 X |
| 4,128,918 | 12/1978 | Wenk . |
| 4,183,120 | 1/1980 | Thorne . |
| 4,306,740 | 12/1981 | Kleykamp et al. ......... 24/20 T T X |
| 4,372,011 | 2/1983 | Aranyos . |
| 4,557,024 | 12/1985 | Roberts et al. ................. 24/16 R X |

Primary Examiner—James R. Brittain
Attorney, Agent, or Firm—Stephen D. Carver

[57] ABSTRACT

A plastic tube bundle clamp for securing a plurality of elongated conduit elements such as wires, tubes, or pipes functions without destructive discontinuities in the working surface of the constrictive band. The encircling plastic band terminates in a pair of shoulders, each of which includes an integral, outwardly projecting jaw. When the jaws are compressively forced together, teeth engage one another to lock the clamp. The first jaw comprises spaced apart upper and lower elements which sandwich a first slot and the second jaw comprises an upper element spaced apart from a reduced width, lower element across a second slot. When the jaws are fitted together, the upper element of the second jaw is sandwiched within the first slot, and the lower element of the first jaw is substantially sandwiched within the second slot. The first jaw lower element comprises an elongated notch, preferably of a width substantially one-half the width of the band, which borders an elongated retainer wall, and the notch and the wall are integral with the substantially planar portion. The lower element of the second jaw has a width approximately half the width of the band, and it is matingly received within the notch, closely abutting the adjacent retainer wall, when the jaws are snapped together. The undersides of each jaw lower element smoothly unite to present a substantially circular, continuous bundle-containing surface which is free of destructive discontinuities.

2 Claims, 3 Drawing Sheets

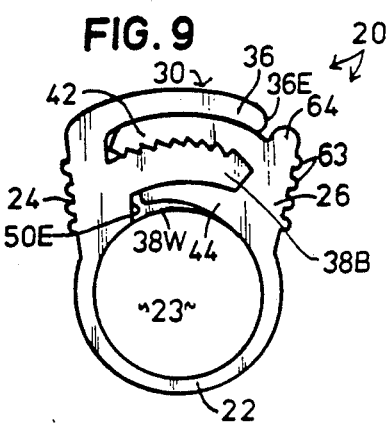
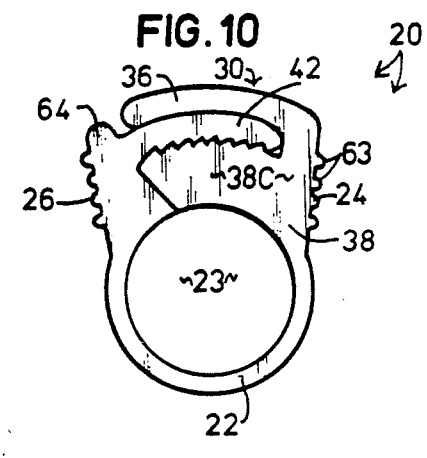
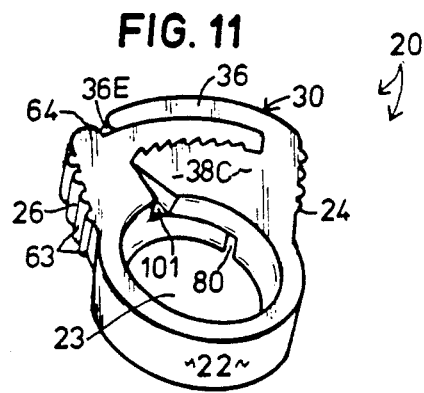
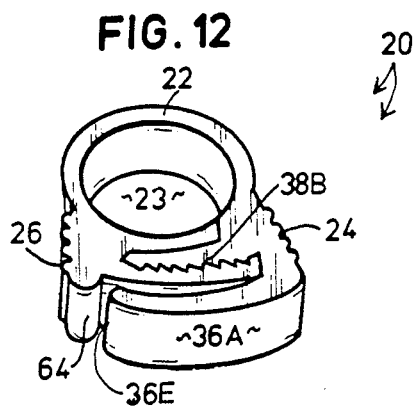
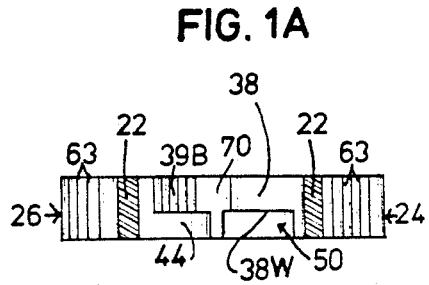
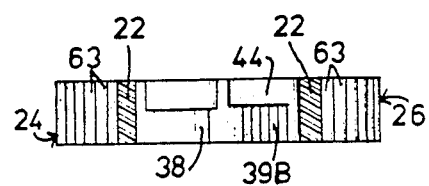

LEAK REDUCTION HOSE CLAMP

BACKGROUND OF THE INVENTION

The present invention relates generally to plastic tube bundle clamps. More particularly, the invention relates to a unitary clamp comprising two cooperating jaws which interlock to form a substantially circular, gap-less and leak-proof mounting orifice This invention is believed best classified in U.S. Utility Class 24, subclass 16 R.

In recent years plastic tubing or hose clamps have become increasingly popular. Such devices are typically integrally molded from plastic, and they include a circular band portion adapted to encircle the cables or other items being fastened, which terminates in integral, cooperating jaws which may be snap-fitted together. Typical jaws comprise one or more cooperating elements, which are provided with suitable teeth to interfit with one another when the jaws are compressed together As the jaws are compressed, the band portion of the clamp is vigorously tightened about the tubes, wires, conduits or the like to be restrained.

Representative of such prior art clamp elements is U.S. Pat. No. 3,605,200 issued to Vallinotto et al. on Sept. 20, 1971. The '200 device comprises a generally U-shaped clamp terminating at each end in an open jaw comprising a toothed edge and an opposing smooth edge. When properly sealed, the toothed edges interlock and the smooth jaw portions remain slidably coupled to provide a smooth clamping surface. Similarly, U.S. Pat. No. 4,372,011 issued to Aranyos on Feb. 8, 1983 comprises a unitary ring having a plurality of interlocking toothed jaw members and a sealing rib formation. The Aranyos device includes an internally defined shoulder adapted to limit travel of the jaw members relative to one another to prevent over-tightening. U.S. Pat. No. 3,925,851 (this device is illustrated in FIG. 17 of the accompanying drawings) issued to Bevins on December 16, 1975 comprises a similar hose clamp the internal ring of which comprises a conical surface terminating in a definitive ridge. When the clamp is closed, the ridge projects inwardly to more firmly contact the outer surface of the hose and prevent loosening or leakage. A pair of indentions or shoulders are provided to limit travel of the jaw members relative to one another and prevent over tightening.

U.S. Pat. No. 4,128,918 issued to Wenk, discloses an adjustable snap-on clamp having a band and a pair of cooperating jaws equipped with teeth which interlock with one another. A special cantilevered tongue construction is employed to aid the efficiency of jaw function. Importantly, because of the tapered lower jaw element, the device internally approximates a circular cross sectional profile to prevent damage to bundled tubes, wires or the like when the jaws are forcibly compressed. Other prior art clamps of lesser relevance to my invention include U.S. Pat. Nos. 4,183,120; 3,229,998; and, 673,382.

One problem associated with known prior art tubing clamps is that the jaws may inadvertently become opened when subjected to certain stresses. All plastic tubing clamps known to me can be manually forced open when the jaws are transversely moved relative to one another. However, such transverse jaw displacements may occur in active installations, when the bundle ties are employed with parts which are subject to vibrations or movement which might induce shearing stresses. For example, it is well recognized that when used with fuel lines adjacent to internal combustion motors, vibrational and bending forces may tend to transversely displace the clamp jaws In extreme situations the jaws may become transversely displaced from one another enough to totally separate and release the clamp. My clamp is designed to prevent such opening.

Another problem is that clamps tend to "leak." In other words, when the jaws are forced together, the inner substantially circular periphery of the band, which is in close contact with the elements restrained by the clamp, may have internal gaps or surface discontinuities. Gap-like discontinuities may form between the leading edge of the inner bottom jaw element, and the opposite side of the band at which said leading edge terminates. Wires or tubes lodged in this area can become damaged when the clamp is thereafter tightened.

It is thus desirable to present, to the fullest extent possible, a continuous, gapless inner band periphery which is free from irregularities or surface discontinuities. The band should have no 37 gaps" or discontinuities of the type which extend across its entire width. The aforementioned Wenk reference attempts to accomplish this by providing a lower jaw member of tapering construction. The thin leading element of the lower jaw essentially tangentially contacts the underside of the opposite jaw, so that its inner periphery approximates the continuous smooth geometry of a circle. Nevertheless, with this clamp and with others, the small discontinuity formed can be disadvantageous. And, in many prior art designs, the width of the unwanted gap is a function of jaw compression. The less the jaws are compressed, the wider the exposed gap is.

Gaps of this nature encourage the destruction of that bundle or tube element compressibly wedged into the gap region. The undesirable resultant "leak" characteristic of the bundling clamp is thus enhanced. I have found it to be extremely desirable to provide some form of physical contact within the inner periphery of the clamp against the circumference of the bundled wires or tubes, even when the clamp is only partially compressed. In other words, it is extremely desirable that the cable clamp provide at least a portion of plastic surface to form a continuous inner plastic contact area of substantially circular dimensions so that no wire, or tube will destructively be forced against any internal boundary discontinuity or gap.

SUMMARY OF THE INVENTION

The present invention comprises a plastic tubing clamp for securing a plurality of elements such as wires, tubes, pipes, or other conduits for securing them together. The instant clamp comprises a non-destructive jaw construction which reduces discontinuities in the surface of the band which tightly contacts the conduits. Although the band may be deployed upon conduit bundles of different diameters, it constantly maintains a substantially circular, continuous inner periphery which non-destructively restrains the captivated bundle.

The tube bundling clamp comprises an elongated, plastic band which is adapted to encircle the elements to be restrained. The resilient band terminates in a pair of massive shoulders, each of which includes an integral, outwardly projecting jaw. When the jaws are compressively forced together, the teeth defined therein engage one another to lock the clamp.

A first jaw comprises spaced apart upper and lower elements which define a slot therebetween. The second jaw is similar, including an upper element spaced apart from a second reduced width, lower element across a second slot. When the jaws are fitted together, the upper element of the second jaw is sandwiched within the first slot, and the lower element of the first jaw is substantially sandwiched within the slot of the second jaw.

To resist unlocking displacements, and to minimize the destructive capacity of the tightened band, the jaws are specially configured. The first jaw lower element comprises an elongated notch, preferably of a width substantially less than the width of the band, which borders an elongated retainer wall. The notch and the wall are integral with a substantially horizontal planar portion of the lower jaw. The lower element of the second jaw is also of a reduced width, preferably comprising a width of approximately half the width of the band, and it is matingly received within the previously described notch, closely abutting the adjacent retainer wall, when the jaws are fitted together. The undersides of each jaw lower element are smoothly continuous with the inner band surface. They unite to present a substantially circular, continuous bundle-contacting surface. The only gaps in this surface fail to extend across the entire width of the bundle-contacting surface.

As a result, the band presents a smoothly continuous, circular inner periphery to the constrained elements about which it is fastened. A circular profile is maintained by the restrained bundle. Secondly, bending moments transmitted to the bundled tubes or elements do not produce transverse jaw displacements which might unfasten them. Instead, when the constrained bundle elements are deflected in one direction, they will normally urge the clamp retainer wall into contact with the second jaw lower element. Opposite bundle movements will force the second jaw lower against the retainer wall. Thus the two jaws are prevented from transversely disassociating in response to bending movements of the type encountered in dynamic installations.

Thus a primary object of the present invention is to provide a reliable plastic tubing clamp which presents a smooth and continuous inner profile A similar object is to provide a band which exhibits non-destructive characteristics.

Another object of the present invention is to provide a bundle clamp of the character described which simultaneously resists transverse separation of the jaws. It is a feature of the present invention that normal bending moments encountered in active installations cannot displace the jaws transversely relative one another to separate the interlocked teeth.

A fundamental object of the present invention is to provide a leak-proof bundle clamp.

Another object of the present invention is to provide a bundle clamp of the character described which may be easily installed with existing tools, and reliably employed with a wide variety of tubular wire-like elements which need to be fastened.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIGURE 1A is a sectional view taken generally along line 1A—1A 1A of FIG. 1;

FIG. 2A is a sectional view taken generally along line 2A—2A 2A of FIG. 2;

FIG. 9 is a front elevational view of my LEAK REDUCTION HOSE CLAMP with the jaws engaged;

FIG. 10 is a rear elevational view thereof, with the jaws engaged;

FIG. 11 is a rear perspective view of the LEAK REDUCTION HOSE CLAMP as disposed in FIGS. 9 and 10;

FIG. 12 is a frontal perspective view of the clamp;

DETAILED DESCRIPTION OF THE DRAWING

Figure 1:
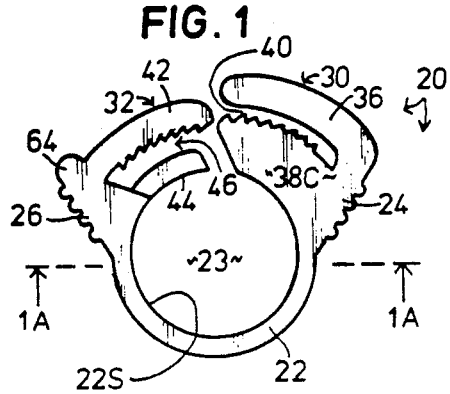
FIG. 1 is a front elevational view of my LEAK REDUCTION HOSE CLAMP with the jaws unengaged from one another.
Figure 2:
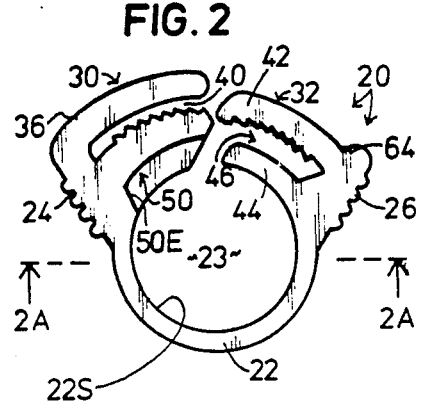
FIG. 2 is a rear elevational view of the clamp with the jaws unengaged from one another.

With initial reference now directed to FIGS. 1-12, 1A and 2A of the appended drawings, a tube bundling clamp constructed in accordance with the teachings of the present invention has been generally designated by the reference numeral 20. Clamp 20 is preferably integrally molded from nylon into a single part. It is designed to be snap-fitted about a plurality of tubes, conduits or other wire-like elements for securing them together in a bundle.

The resilient plastic band portion 22 comprises a generally circular central portion which terminates in opposite, integral shoulders 24, 26 forming its opposite ends. The shoulders support the jaw members with which they are integral. A first jaw 30 projects integrally outwardly from shoulder 24. A second jaw 32 projects integrally outwardly from shoulder 26 toward jaw 30. The jaws may be snap-fitted to one another to lock the clamp in position It will be appreciated that as locking occurs, the generally circular interior 23 of the clamp will be penetrated by the tensioned wires or conduit elements restrained by the clamp.

With additional combined reference now directed to FIGS. 13 through 18, the first jaw 30 comprises an elongated, arcuate upper element 36 spaced-apart from a cooperating elongated lower element, generally designated by the reference numeral 38. Upper element 36 comprises an upper outer surface 36A (FIGS. 3, 12) and it terminates in a smoothly radiused outer end 36E (FIGS. 11, 12). Lower element 38 comprises a planar, substantially horizontal body portion 38B having a downwardly projecting, perpendicularly oriented, reduced-width retainer wall 38W. The outer wall 38C (FIGS. 1, 11, 18) forms the back of horizontal portion 38B and retainer wall 38W. As best viewed in FIGS. 1 and 2, jaw element 38 is spaced-apart from the upper element 36 with a generally arcuate slot 40 defined therebetween. Both jaw elements 36 and 38 project away from the shoulder 24 and are integral therewith.

Figure 3:
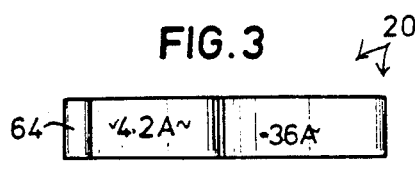
FIG. 3 is a top plan view taken from a position above the top of FIG. 1 and looking down.
Figure 4:
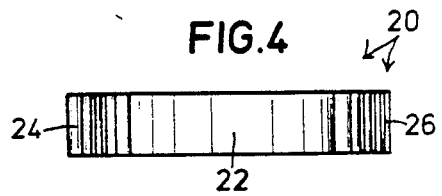
FIG. 4 is a bottom plan view taken from a position below FIG. 2 looking up.
Figure 5:
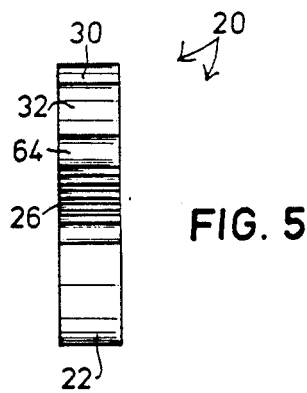
FIG. 5 is a left side elevational view, taken generally from a position to the left of FIG. 1.
Figure 6:
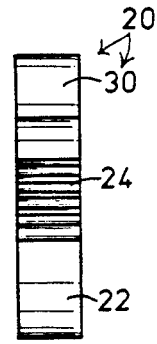
FIG. 6 is a right side elevational view, taken generally from a position to the right of FIG. 1.
Figure 7:
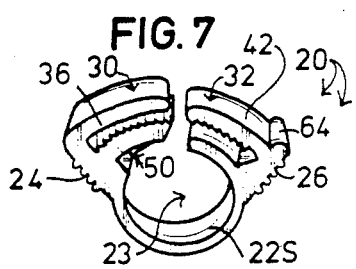
FIG. 7 is a frontal perspective view of the LEAK REDUCTION HOSE CLAMP.
Figure 8:
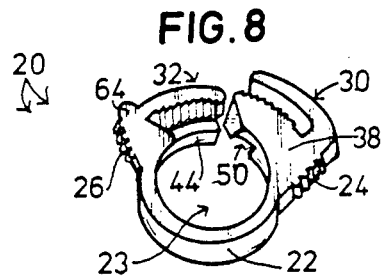
FIG. 8 is a rear perspective view thereof.

The second jaw member 32 comprises an elongated upper arcuate element 42 spaced apart generally parallel from a lower, reduced-width, arcuate element 44. Element 44 has an underside 44S (FIGS. 15, 18) which is generally continuous with band inner surfaces 22S, but which is of a reduced diameter. Elements 42 and 44 project integrally outwardly from shoulder 26 towards first jaw 30. The outermost surface of element 42 is identified by the reference numeral 42A (FIG. 3). A second arcuate slot 46 is defined between elements 42 and 44.

The outermost edges of each shoulder 24, 26 include a plurality of serrations 63 which enhance the grip strength of a conventional installation tool (not shown) which forces the jaws together during clamp installation. Shoulder 26 extends to an upper, radiused elbow portion 64 which projects somewhat above the upper surface 42A (FIG. 3) of element 42. When the two jaws 30 and 32 are compressed together, element 42 of the second jaw member will be forced into slot 40 of the first jaw member. Similarly, the major central body portion 38B of the first jaw member will be forced into slot 46 of the second jaw member. Element 44 will be received within a notch 50 (FIGS. 2, 8) adjacent wall 38W, as will be explained in more detail hereinafter.

Figure 14:
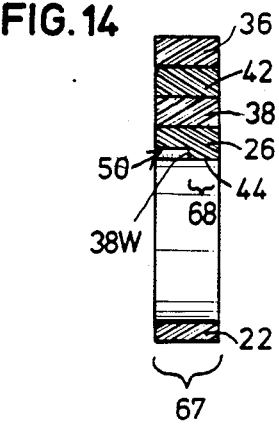
FIG. 14 is a longitudinal sectional view taken generally along line 14—14 of FIG. 13 in the direction of the arrows.

The lower element 38 of the first jaw member includes a notch 50 defined in its underside for receiving element 44 when the jaws are compressed together. With reference to FIG. 14, the width of the band 22, and the width of the major structural shoulder portions has been indicated with the reference numeral 67. The lower element 44 of the second jaw member however, preferably has a width 68 of approximately half the width of band width 67. Thus the band underside is relieved somewhat by notch 50, but the lowermost surface 69 (FIGS. 15, 18) of wall 38W adjacent notch 50 smoothly align with the inner surface 22S of the band to provide a continuous circular cross-sectional profile Only the generally planar body portion 38B (FIG. 18) of jaw element 38 is actually disposed within gap 46 when the clamp is assembled. Further, as best viewed in FIG. 18, the inclined leading edge 70 of jaw element 38 is adapted to smoothly approach the appropriately configured inner shoulder 72 at the end of slot 46, and teeth 39A and 39B of the jaw elements are adapted to fit together as shown, for example, in FIGS. 9 through 12 when the clamp is assembled.

Figure 13:
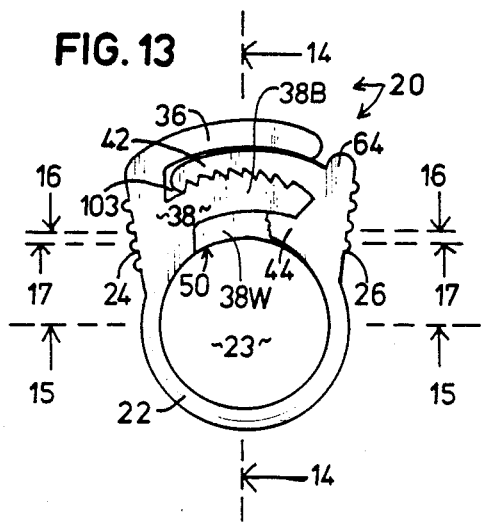
FIG. 13 is a fragmentary front elevational view similar to FIG. 9.
Figure 15:
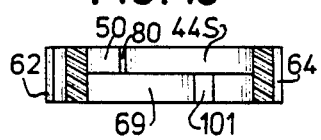
FIG. 15 is a sectional view taken generally along line 15—15 15 of FIG. 13 in the direction of the arrows.
Figure 16:
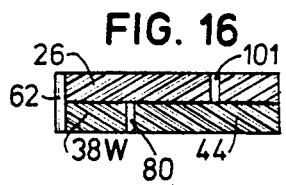
FIG. 16 is a sectional view taken generally along line 16—16 16 of FIG. 13 in the direction of the arrows.
Figure 18:
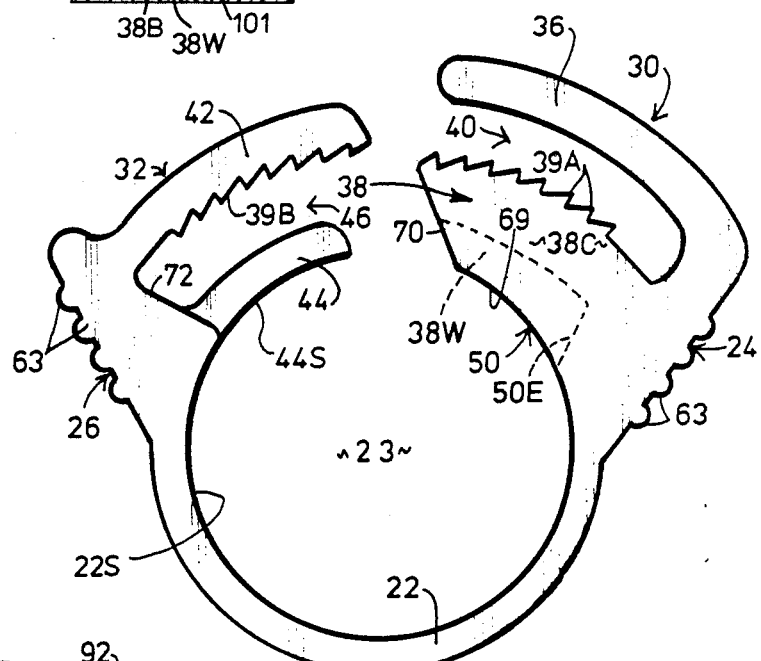
FIG. 18 is an enlarged elevational view of the preferred clamp.

A careful inspection of FIGS. 9, 10 and 13 will reveal that when the clamp 20 is compressed together, a smooth, circular cross-section results, and orifice 23 thus defines a continuous circular inner periphery free of discontinuities. In other words, in the region under the compressed-together jaws, undersides 69 and 44S are smoothly integral and continuous with band inner surfaces 22S. As best seen in FIG. 15, while reduced with gaps 80 and 101 exist, no gap extends all the way across the width of the clamp.

Small spaces exist between abutting ends of interfitting elements, but the width of these spaces is only half the width 67 of band 22. A space 80 (FIGS. 15, 16) will exist between the end of element 44 and wall 50E (FIGS. 2, 9) of notch 50. A similar space 101 (FIGS. 15-17) will exist between edge 70 of jaw element 38 and the shoulder 72 (see FIG. 11). These spaces 80 and 101 are not continuous, they have a width of only one-half the band width 67. In other words, a tightly bundled wire cannot fit into these regions, because it is restrained by contact with the underside of the adjacent jaw structure.

Figure 17:
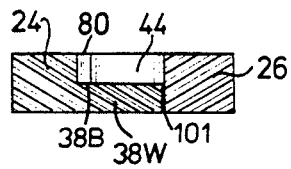
FIG. 17 is a sectional view taken generally along line 17—17 17 of FIG. 13.
Figure 19:
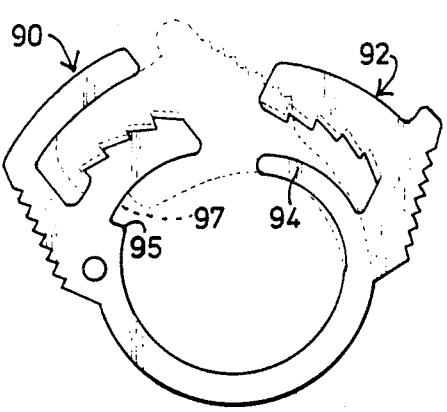
FIG. 19 illustrates a typical prior art clamp.

It is important to compare FIG. 17 with the prior art illustrated in FIG. 19 to understand the critical "gapless" characteristics defined herein. It will be noted from inspection of FIG. 19 that when jaw 90 is compressed into jaw as indicated by the phantom lines, lower element 94 will be spaced apart from ridge 95 whereby to leave a gap 97. This gap 97 extends the entire width of the band.

In the present clamp, a slight space 80 exists between element 44 and shoulder 24 in clamp 20, but that gap 80 does not allow a bundle to "leak" into it, since it is adjacent the smooth underside of jaw member 38. As viewed in FIGS. 13 and 15, the smooth underside of jaw member 38 is coextensive with the generally circular profile defined by the band 22. Hence a bundled wire or element cannot escape into gap 80 and enter that area, since it will contact the underside of element 38.

Thus, gap 97 which is objectionable in prior art devices (FIG. 19) has in effect been split into two cooperating halves by the present design. A continuous circular internal supporting periphery is presented by the present band at all times to provide leak-proof construction.

Further, when the clamp is installed, width-wise translations of movement cannot dislodge the jaws from one another. By way of background, when a clamp is compressed together with nothing in space 23, the jaw members may be removed from one another by transversely deflecting one jaw member relative to the other. If for example, in FIG. 1, jaw 32 is maintained horizontal, and jaw 30 is lifted upward towards the viewer, the toothed elements will separate. However, wedging action from constrained bundles of elements captivated within orifice 23 cannot force these elements apart in this fashion. For example, if elements projecting towards the viewer (as seen in FIG. 1) were deflected upwardly, they would contact jaw element 38, which would be edged rearwardly (away from the viewer in FIG. 1) into contact with inner element 44 at its opposite side. If bundled elements projecting toward the viewer from FIG. 1 were deflected downwardly, resultant translational movement on the opposite side would contact element 44 driving it into contact within notch 50 with jaw member 38. Thus, transverse movements imparted by dynamic mounting of clamp 20 upon tightly bundled members will not stress the jaws in such a way so as to displace and disengage the jaw elements.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A plastic tube bundling clamp for securing together a bundle of elongated elements such as cables, hoses, wires, pipes, or conduits, said tube bundling clamp comprising:

first and second spaced apart sides;

resilient, plastic band means for encircling a bundle of said elements, said band means having a width extending between said first and second sides and said band means terminating in opposite, rigid shoulders adapted to be compressed together;

jaw means integrally associated with said opposite shoulders for snap fitting together to install said clamp, said jaw means comprising a plurality of interlocking teeth which forcibly engage one another, and said jaw means comprising:

a first jaw comprising:

an elongated, arcuate upper element having a predetermined width;

a cooperating, generally parallel and spaced-apart elongated lower element comprising an arcuate horizontal body portion generally parallel with and spaced apart from said upper element, an integral retaining wall projecting downwardly from said horizontal body portion, said retaining wall having an underside and a width less than the width of said band means, and a notch defined beneath said lower element adjacent said retaining wall having a width less than the width of said band means; and, a first elongated, generally arcuate slot defined between said upper and lower elements; and, a second jaw comprising:

an elongated upper arcuate element adapted to be received within said first arcuate slot when said first and second jaws are fitted together, said last mentioned upper element having a width substantially equal to the width of said first jaw upper element;

a lower, arcuate element generally parallel with and spaced apart from said last mentioned upper arcuate element having an underside and a width substantially equal to the width of said notch; and, a second arcuate slot defined between said last mentioned upper and lower jaw member elements adapted to receive at least a portion of said first jaw lower element arcuate body portion when said first and second jaws are fitted together;

said lower element of said second jaw member engaging said notch when the jaw members are compressed together and closely abutting said retaining wall such that the underside of said retaining wall and the underside of said second jaw lower arcuate member form a substantially continuous surface extending between the sides of said clamp without gaps, and the clamp thus presents a continuous, substantially circular, leak proof internal periphery in contact with the bundle of elements captivated by the installed tube bundle clamp.

2. A plastic tube bundling clamp for securing together a bundle of elongated elements such as cables, hoses, wires, pipes, or conduits, said tube bundling clamp comprising:

first and second spaced apart sides;

resilient, plastic band means for encircling a bundle of said elements, said band means having a width extending between said first and second sides and said band means terminating in opposite, rigid shoulders adapted to be compressed together;

jaw means integrally associated with said band means and projecting away from said opposite shoulders thereof for snap fitting together to install said clamp, said jaw means comprising a plurality of interlocking teeth which forcibly engage one another, and said jaw means comprising:

a first jaw comprising:

an elongated, arcuate upper element having a width substantially equal to the width of said band means;

a cooperating, generally parallel and spaced-apart elongated lower element comprising an arcuate horizontal body portion generally parallel with and spaced apart form said upper element, an integral retaining wall projecting downwardly from said horizontal body portion, said retaining wall having an underside and a width less than the width of said band means, and a notch defined beneath said lower element adjacent said retaining wall having a width less than the width of said band means; and, a first elongated, generally arcuate slot defined between said upper and lower elements; and, a second jaw comprising:

an elongated upper arcuate element adapted to be received within said first arcuate slot when said first and second jaws are fitted together, said last mentioned upper element having a width substantially equal to the width of said band means;

a lower, arcuate element generally parallel with and spaced apart from said last mentioned upper arcuate element having an underside and a width substantially equal to the width of said notch; and, a second arcuate slot defined between said last mentioned upper and lower jaw member elements adapted to receive at least a portion of said first jaw lower element arcuate body portion when said first and second jaws are fitted together;

said lower element of said second jaw member engaging said notch when the jaw members are compressed together and closely abutting said retaining wall such that the underside of said retaining wall and the underside of said second jaw lower arcuate member form a substantially continuous surface extending between the sides of said clamp without gaps, and the clamp thus presents a continuous, substantially circular, leak proof internal periphery in contact with the bundle of elements captivated by the installed tube bundle clamp.

* * * * *